United States Patent
Tolley et al.

(10) Patent No.: US 7,341,662 B2
(45) Date of Patent: Mar. 11, 2008

(54) DISTRIBUTION AND COLLECTION HEADERS FOR A FILTER BED

(76) Inventors: Derek Colin Tolley, 41 High Street, Bewdley, Worcestershire DY12 2DJ (GB); Asheley Derek Tolley, 3 Gorsfach, Dafen, Llanelli SA14 8NG (GB)

( * ) Notice: Subject to any disclaimer, the term of this patent is extended or adjusted under 35 U.S.C. 154(b) by 0 days.

(21) Appl. No.: 10/492,823

(22) PCT Filed: Oct. 15, 2002

(86) PCT No.: PCT/GB02/04705

§ 371 (c)(1),
(2), (4) Date: Sep. 27, 2004

(87) PCT Pub. No.: WO03/033099

PCT Pub. Date: Apr. 24, 2003

(65) Prior Publication Data

US 2005/0035071 A1 Feb. 17, 2005

(30) Foreign Application Priority Data

Oct. 18, 2001 (GB) ................................. 0125141.2

(51) Int. Cl.
*B01D 24/40* (2006.01)
*B01D 24/42* (2006.01)
*B01D 24/46* (2006.01)
(52) U.S. Cl. ........................ 210/275; 210/279; 210/456; 210/787; 210/793
(58) Field of Classification Search .................. 210/279
See application file for complete search history.

(56) References Cited

U.S. PATENT DOCUMENTS

| 425,573 | A | * | 4/1890 | Jewell | 210/276 |
|---|---|---|---|---|---|
| 727,230 | A | * | 5/1903 | Underwood | 210/203 |
| 949,455 | A | * | 2/1910 | Usher | 423/27 |
| 1,978,015 | A | * | 10/1934 | Erdman | 134/24 |
| 2,461,619 | A | * | 2/1949 | Wolcott | 210/279 |
| 2,627,503 | A | * | 2/1953 | Anderson | 210/190 |
| 2,768,750 | A | * | 10/1956 | Kryzer | 210/232 |
| 2,773,829 | A | | 12/1956 | Hunting | 210/24 |
| 2,973,097 | A | * | 2/1961 | Snider | 210/279 |
| 3,158,177 | A | * | 11/1964 | Schulz et al. | 137/592 |
| 3,317,044 | A | * | 5/1967 | Marks | 210/96.1 |
| 3,384,240 | A | * | 5/1968 | Berardi | 210/136 |
| 3,391,707 | A | * | 7/1968 | Riley et al. | 137/590 |
| 3,402,126 | A | * | 9/1968 | Cioffi | 521/26 |
| 3,451,554 | A | * | 6/1969 | Wade | 210/278 |
| 3,472,382 | A | * | 10/1969 | Duff et al. | 210/279 |
| 3,493,116 | A | | 2/1970 | Edmiston | 210/266 |
| 3,532,216 | A | * | 10/1970 | Cederholm et al. | 210/95 |
| 3,547,270 | A | * | 12/1970 | Kass | 210/264 |

(Continued)

FOREIGN PATENT DOCUMENTS

| DE | 2100281 | 7/1972 |
|---|---|---|
| EP | 1068888 | 1/2001 |
| GB | 1342082 | 12/1973 |
| RU | 1784256 | 12/1992 |

*Primary Examiner*—Robert James Popovics
(74) *Attorney, Agent, or Firm*—Gordon & Jacobson, PC

(57) ABSTRACT

A filtration vessel has an inlet for inflow into the filtration vessel of liquid media to be filtered, a body of filter media in the filtration vessel, and a drain to receive filtered liquid media for take off from the filtration vessel. The inlet is configured to induce rotating flow about the vessel of unfiltered liquid present in the vessel; and/or, the drain is configured in backwash mode to force backwash liquid through the filter media in rotating flow about the vessel; and/or the drain includes drain limbs inclined to the horizontal and providing for draining of filtered liquid along the inclined limbs to outlet.

18 Claims, 5 Drawing Sheets

U.S. PATENT DOCUMENTS

| | | | | |
|---|---|---|---|---|
| 3,552,569 A * | 1/1971 | Zievers et al. | | 210/189 |
| 3,617,558 A * | 11/1971 | Jones | | 210/677 |
| 3,625,365 A * | 12/1971 | Armstrong et al. | | 210/232 |
| 3,662,780 A * | 5/1972 | Marsh | | 137/590 |
| 3,707,233 A * | 12/1972 | Lerner | | 210/278 |
| 3,747,768 A * | 7/1973 | Barrera | | 210/288 |
| 3,762,395 A * | 10/1973 | Taylor | | 122/17.1 |
| 3,809,247 A | 5/1974 | Brett | | |
| 3,834,537 A * | 9/1974 | Brett | | 210/136 |
| 3,954,620 A * | 5/1976 | Nebolsine | | 210/275 |
| 3,984,327 A * | 10/1976 | May | | 210/284 |
| 4,048,067 A | 9/1977 | Cheng | | 210/73 |
| 4,105,555 A * | 8/1978 | Pease | | 210/136 |
| 4,141,824 A | 2/1979 | Smith | | 210/17 |
| 4,161,963 A * | 7/1979 | Stevens | | 137/592 |
| 4,169,793 A | 10/1979 | Lockshaw | | |
| 4,200,536 A * | 4/1980 | Kaufman | | 210/279 |
| 4,228,013 A * | 10/1980 | Degenkolb et al. | | 210/264 |
| 4,319,605 A * | 3/1982 | Boudin | | 137/590 |
| 4,328,833 A * | 5/1982 | Aurther | | 137/625.47 |
| 4,414,109 A * | 11/1983 | Aurthur | | 210/278 |
| 4,478,716 A * | 10/1984 | Hasegawa et al. | | 210/289 |
| 4,580,597 A * | 4/1986 | Cordingley et al. | | 137/561 A |
| 4,582,608 A * | 4/1986 | Ritacco | | 210/656 |
| 4,657,673 A * | 4/1987 | Kessler | | 210/108 |
| 4,737,292 A * | 4/1988 | Ritacco et al. | | 210/656 |
| 4,744,897 A * | 5/1988 | Yes | | 210/170.02 |
| 4,753,726 A | 6/1988 | Suchanek | | 210/232 |
| 4,814,074 A * | 3/1989 | Auchincloss | | 210/143 |
| 4,869,817 A * | 9/1989 | Mendoza et al. | | 210/169 |
| 5,058,810 A * | 10/1991 | Bonfiglioli et al. | | 239/489 |
| 5,068,033 A * | 11/1991 | Tobias et al. | | 210/169 |
| 5,137,053 A * | 8/1992 | Kale | | 137/592 |
| 5,141,635 A * | 8/1992 | LePlang et al. | | 210/198.2 |
| 5,203,995 A * | 4/1993 | Fernando | | 210/274 |
| 5,480,540 A * | 1/1996 | Day et al. | | 210/181 |
| 5,762,785 A * | 6/1998 | Garrigos Ruiz | | 210/169 |
| 5,884,658 A * | 3/1999 | Cameron | | 137/561 A |
| 6,059,967 A * | 5/2000 | Field | | 210/247 |
| 6,110,440 A * | 8/2000 | Ohta et al. | | 423/351 |
| 6,231,756 B1 | 5/2001 | Haymore | | 210/150 |
| 6,365,044 B1* | 4/2002 | Crane | | 210/248 |
| 6,428,690 B1 * | 8/2002 | Tse | | 210/136 |
| 6,447,675 B1 * | 9/2002 | James | | 210/150 |
| 6,491,817 B1* | 12/2002 | Benesi | | 210/227 |
| 6,605,211 B1 * | 8/2003 | Slopack | | 210/169 |
| 6,685,826 B1 * | 2/2004 | James | | 210/150 |
| 6,709,574 B2 * | 3/2004 | James | | 210/90 |
| 6,919,020 B2 * | 7/2005 | Ekholm | | 210/151 |
| 6,966,987 B1 * | 11/2005 | Morgan et al. | | 210/279 |
| 7,001,521 B2 * | 2/2006 | Paananen et al. | | 210/656 |
| 7,022,230 B2 * | 4/2006 | Imai et al. | | 210/289 |
| 2004/0195162 A1* | 10/2004 | Imai et al. | | 210/289 |

* cited by examiner

DISTRIBUTION AND COLLECTION HEADERS FOR A FILTER BED

BACKGROUND OF THE INVENTION

1. Field of the Invention

The present invention relates to filtration of liquid media and particularly to filtration of water or the like.

2. State of the Art

Filtration apparatus is known for filtering water. Such apparatus typically comprises a vessel pressurised with water having an inlet, a bed of filter media (typically one or more layers of graded sand or other particulate material), and an outlet drain arrangement for directing off the filtered water. In order to periodically clean the filter media a cleaning backwash is forced through the drain arrangement (typically causing fluidisation of the bed of filter media) and the backwashed liquid is drawn off to waste above the level of the bed of filter media.

An improved technique and system has now been devised.

SUMMARY OF THE INVENTION

According to a first aspect, the invention provides filtration apparatus including:
 a filtration vessel;
 an inlet arrangement for inflow into the filtration vessel of liquid media to be filtered;
 a body of filter media in the filtration vessel;
 a drain arrangement to receive filtered liquid media for take off from the filtration vessel; wherein:
  the inlet arrangement is configured to induce substantially rotating flow about the vessel of unfiltered liquid present in the vessel; and/or,
  the drain arrangement is configured in backwash mode to force backwash liquid through the filter media in substantially rotating flow about the vessel; and/or
  the drain arrangement includes a plurality of drain limbs inclined to the horizontal and providing for draining of filtered liquid along is the inclined limbs to outlet the apparatus.

It is preferred that the inlet arrangement comprises liquid directing means arranged to direct pressurised liquid along a tangential or circumferential path with respect to an axis of the vessel. Beneficially, the liquid directing means is arranged to direct the pressurised liquid entering the vessel at an acute angle downwardly.

Beneficially, the inlet arrangement is provided closely adjacent the upper internal surface of the vessel, which upper internal surface of the vessel is beneficially inclined or concave from an upper point to lower portions proximate the periphery of the vessel. This aids in promoting the rotating flow.

Typically the unfiltered water is pressurised in the vessel above the level of the filtration media (which is typically present as a bed laying in the vessel). The inlet arrangement is designed to induce a flow pattern within the vessel to maximise the flow length from the inlet arrangement to the liquid/filter media interface. Creating a rotation from stimulus at the inlet arrangement zone in the liquid space above the filter media provides a body or bulk rotation of the liquid media about the axis of the vessel and ensures:

1. Even flow of liquid media through the filter media bed;
2. Minimal eddy currents at higher flow rates to ensure pressure balance at water/filter media interface and inhibit tunnelling through the filter media; and
3. Retention of flocs on the surface of the filter media at high rates of flow.

In Northern Hemisphere environments the rotation is to be induced in a clockwise direction, whereas in Southern Hemisphere locations anticlockwise rotation is necessary. The reason for the different direction of rotation preferred is due to the coriolis force caused by the earth's rotation. Taking advantage of the coriolis force leads to preferred rotation in different directions in Northern and Southern Hemispheres.

The inlet arrangement preferably comprises a plurality of radially extending duct arms, each including outlet means (typically apertures) to direct pressurised unfiltered liquid transversely to the radial direction. The duct arms are configured to direct the outlet liquid either substantially in a clockwise sense or in an anticlockwise sense (dependant upon the geographical location of the filter vessel either in the Northern or Southern Hemisphere).

Beneficially, the radial duct arms are regularly spaced about an axis, preferably connected to a central or hub plenum inlet chamber. Beneficially the radial duct arm outlet apertures, direct the pressurised liquid at an acute angle outwardly and downwardly from the inlet arrangement within the vessel.

Beneficially the outlet apertures are guarded by filter or mesh means to inhibit filter media or other detritus passing back through the inlet arrangement during the backwash cycle.

It is preferred that the drain arrangement includes a plurality of radially extending limbs, each preferably including apertures, slots or other liquid passage means to act as backwash liquid, distribution means in backwash mode or filtered liquid collection means in normal 'filter mode'. The backwash liquid distribution means (apertures etc) is beneficially configured to distribute backwash liquid in a direction transverse to the longitudinal direction of the respective limbs. Beneficially the backwash outlet means of limbs in the drain arrangement is configured such that in backwash mode the majority (or all) of the limbs direct water in either a clockwise sense or alternatively an anticlockwise sense (depending again upon the geographical location of the filter vessel in either the Northern or Southern Hemisphere).

The backwash outlet means of the radial limbs of the drain arrangement also serve to collect the filtered liquid (in filter mode) having passed through the body of filter media.

The drain arrangement is preferably positioned toward the interior base of the vessel. Beneficially the interior base of the vessel is inclined, concave or dish shaped, the radial limbs of the drain arrangement extending from a lower most end at a radial central zone of the vessel to an upper end raised from the lower end and radially spaced from the centre of the vessel. The radial limbs are therefore effectively inclined, and preferably connect with a radially central drain chamber. Because the limbs are inclined, draining of the filtered liquid into the drain chamber is improved. The limbs can extend at the lowest possible point in the vessel with respect to the inclined, concave or dish shaped interior bottom surface of the vessel. Prior art arrangements have had non-radially configured limbs of a drain arrangement extending substantially horizontally.

Beneficially the apertures providing the backwash outlet or filter media inlet to the drain arrangement are provided over the majority of the length of the radial limb. Slots or the like may be provided at spaced intervals along the length of the limb to achieve this. Beneficially the apertures are provided with filter or mesh guard means to inhibit filter media entering the drain arrangement.

In backwash mode high flow rates are used to ensure efficient backwash cycle without loss of filter media. The purpose of the backwash cycle is to attempt to remove detritus from the body of filter media, including inhibiting the risk of growth of pathogen colonies within the media. This reduces deterioration of the filter performance. This in turn aids in extending the life of the filter media. High flow rates are preferred in the backwash cycle in order to provide a short and efficient backwash cycle reducing the water volume used and further minimising running costs.

According to a further aspect, the invention provides a method of filtering liquid media, the method comprising directing liquid to be filtered into a vessel under pressure, the vessel including a bed of filter media and a drain arrangement for take-off of filtered liquid media from the filtration vessel, wherein liquid present in the vessel above the bed of filter media is caused to undergo rotating flow about the vessel and/or wherein in backwash mode liquid is forced through the filter media effecting rotating flow and fluidisation of the filter media.

BRIEF DESCRIPTION OF THE DRAWINGS

The invention will now be further described in specific embodiments by way of example only with reference to the accompanying drawings in which.

DETAILED DESCRIPTION OF THE PREFERRED EMBODIMENTS

Figure 1:
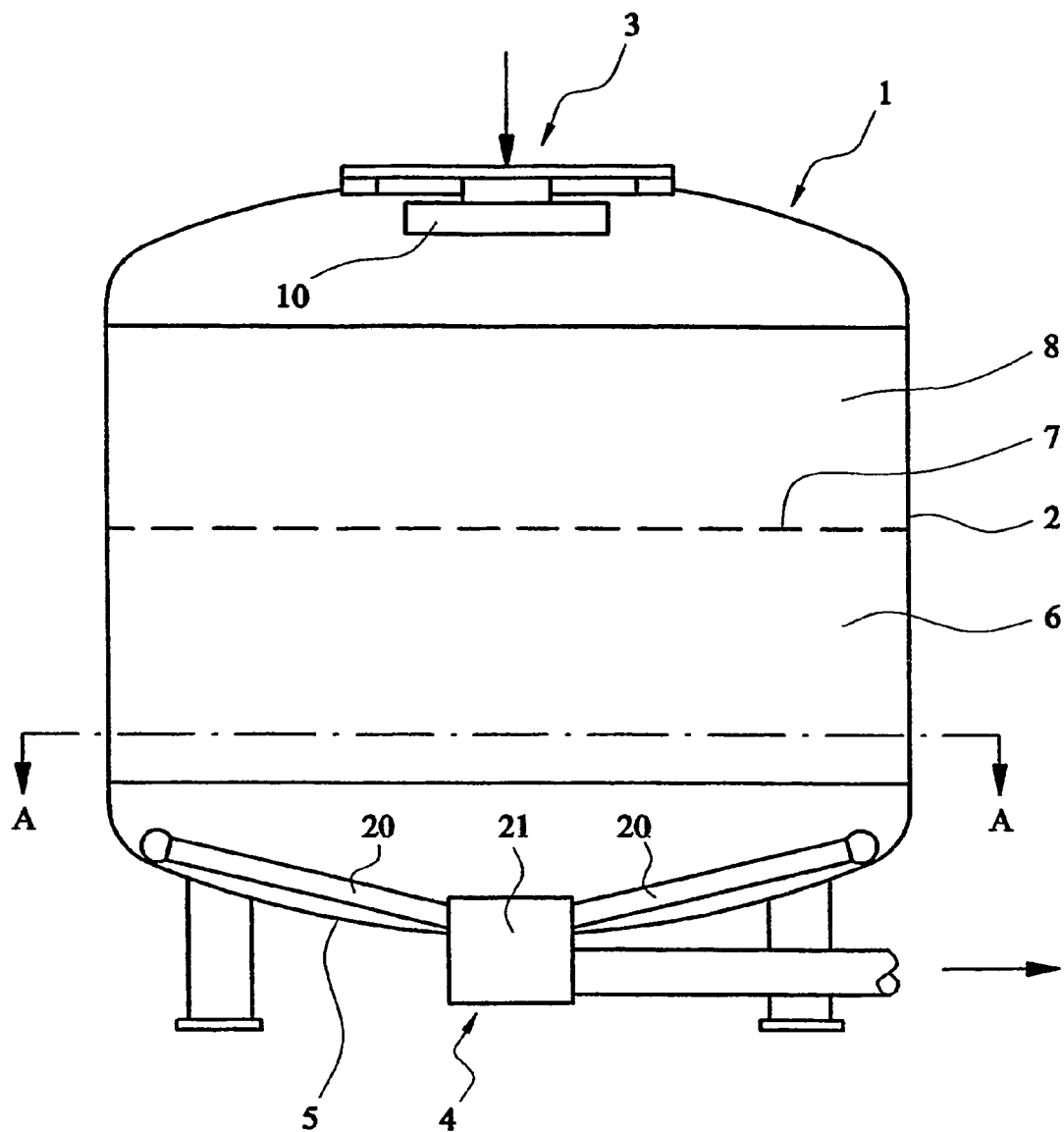
FIG. 1 is a schematic view of a first embodiment of filtration apparatus according to the invention.

Referring to the drawings, and initially to FIG. 1, there is shown a pressure sand filter 1 comprising a filter vessel 2 having a liquid inlet arrangement 3 and a filtered liquid drain arrangement 4. Drain arrangement 4 also operates to supply backwash liquid in 'backwash mode' (as will be described hereinafter).

The vessel 2 has a concave internal bottom 5 upon which rests a bed of filter media 6 extending upwardly to approximately half the depth of the vessel 2. Filter media typically comprises a body of particulate materials such as filter sand which may be single-grade or multi-grade depending upon the precise application of the filter. Activated charcoal/carbon or other particulate material may also be utilised.

Liquid (water) to be filtered is directed under pressure into the vessel 2 via inlet arrangement 3 such that the pressurised head volume 8 of liquid is present above the surface 7 of filter media bed 6 in head space 8.

An important aspect of the invention is the ability of the inlet arrangement 3 to direct pressurised unfiltered inlet liquid such that upon entry into the head space 8 bulk rotation of liquid in head space 8 is created about the central axis of the vessel 2. Such an effect enables a situation approaching hydraulic balance to be achieved at the liquid/filter media interface providing even flow through the filter bed, minimising eddy currents and avoiding tunnelling into the filter media.

In order to achieve this the liquid inlet comprises a filter head 10 having a plurality of regularly spaced radial arms 11 extending outwardly from a central plenum 12. Central plenum 12 includes perforations permitting unfiltered liquid media to enter directly into head space 8, although a large proportion of the liquid entering is directed via arms 11 as will be described hereafter.

Figure 3A:
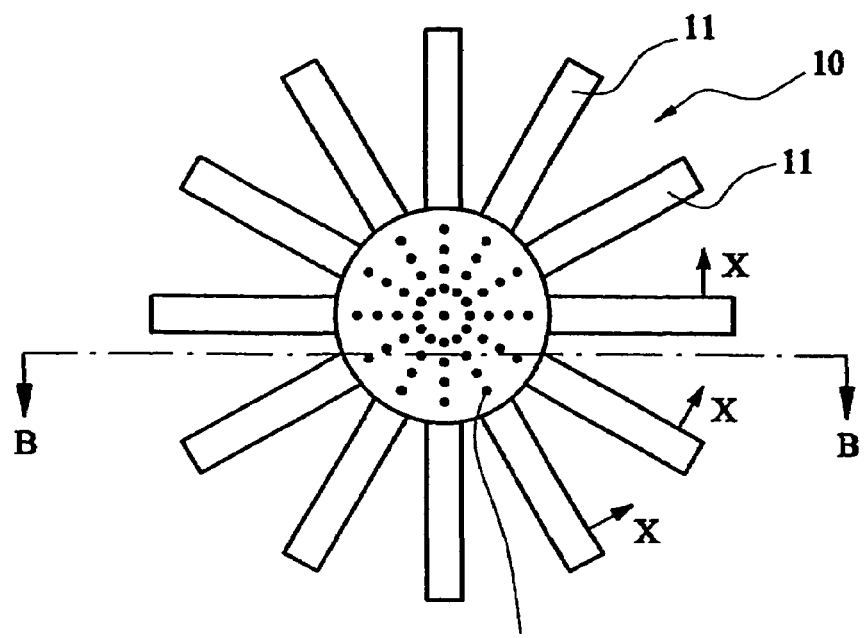
FIGS. 3a, 3b, and 3c are plan, side and detail views of a liquid inlet arrangement in accordance with the apparatus of the invention.
Figure 3B:
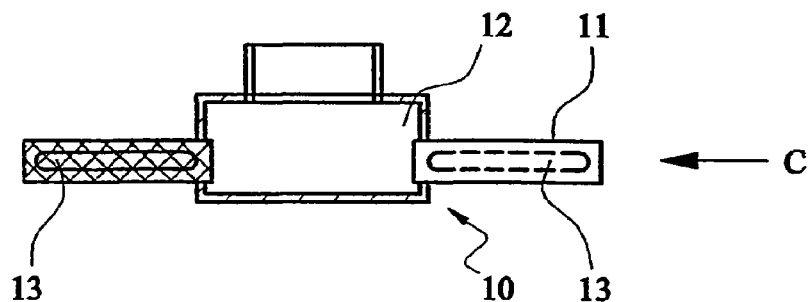
Figure 3C:
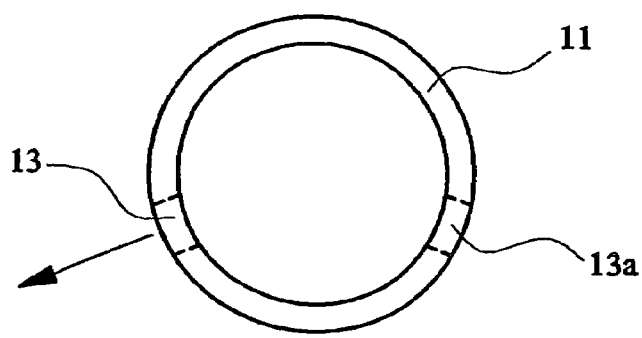

Arms 11 communicate with plenum 12 and are generally tubular in cross-section (as shown most clearly in FIG. 3c). Respective angled slots 13 are provided for each of limbs 11, slots 13 being configured to direct jetting pressurised liquid out of arm 11 in a direction transverse to the longitudinal direction to arm 11. As can be seen from FIG. 3c, the slots 13 are arranged to direct the outlet jetting liquid also at an inclined angle downwardly into the vessel.

FIG. 3c shows an alternative slot 13a. It should be noted that slots 13 and 13a are not provided in a single embodiment. Slots 13 and 13a are provided as alternatives for use in Northern and Southern Hemispheres where contra-sense rotation of the liquid in head space 8 is required.

Referring to FIG. 3a, each limb 11 directs liquid tangentially (transversely to the longitudinal direction of respective arms 11) in the direction of arrows X. This directional jetting of inlet liquid is sufficient to initiate the required rotating flow in the body of pressurised liquid in head space 8.

Figure 4A:
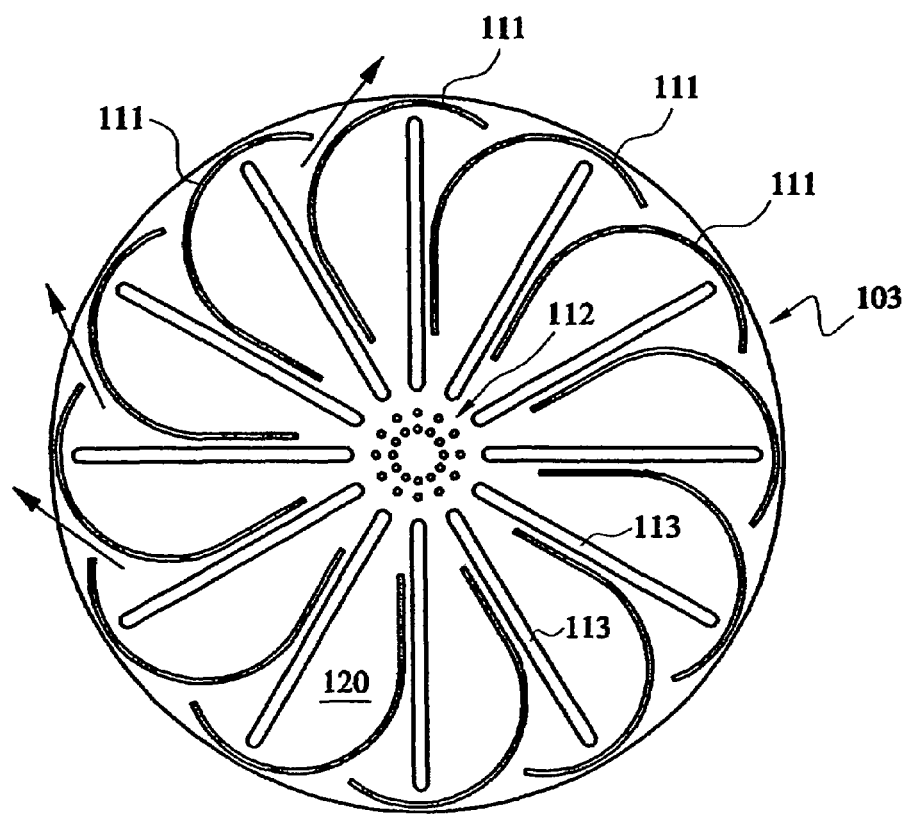
FIGS. 4a, 4b, and 4c are section, side and detail views of an alternative embodiment of liquid inlet arrangement.
Figure 4B:
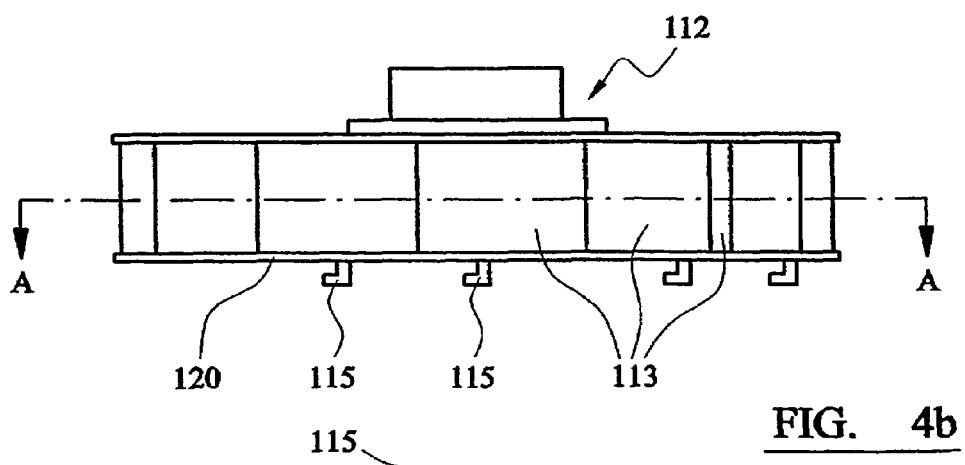
Figure 4C:
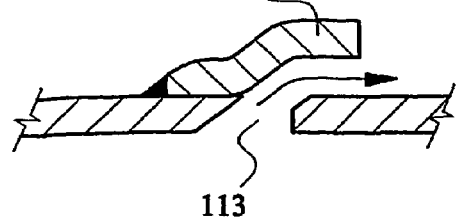

Referring to FIG. 4 and 4a, an alternative arrangement 103 is disclosed comprising a central plenum hub 112, and a series of curve-form vanes 111 regularly angularly spaced about hub 112 and extending outward away from the central plenum hub 112. The lower surface 120 of the inlet arrangement 103 includes a series of radially extending angularly spaced slots 113 and a welded deflection plate 115 to direct the pressurised liquid in the required inlet direction into the interior of vessel 2. Vanes 111 direct the water entering into the inlet arrangement radially outwardly some being forced through slots 113 and some exiting tangentially between outlet apertures formed between the distal ends of vanes 111 and the back of an adjacent vane.

The drain arrangement 4 (shown most clearly in FIGS. 1, 2 and 5) comprises a series of angularly spaced radially extending limbs 20 communicating with an axial drain chamber 21. The limbs effectively rest as closely as possible upon the concave-base 5 of vessel 2, extending in inclined fashion upwardly from drain chamber 21 to their respective distal radially outermost ends. This is a departure from typical prior art arrangements in which a network of perpendicularly crossing lateral drain limbs are provided, mounted on a concrete or other solid base in horizontal fashion. The inclined orientation of the drain limbs 20 provides for draining into a central drain chamber or hub is believed to be novel and inventive per se.

Figure 2:
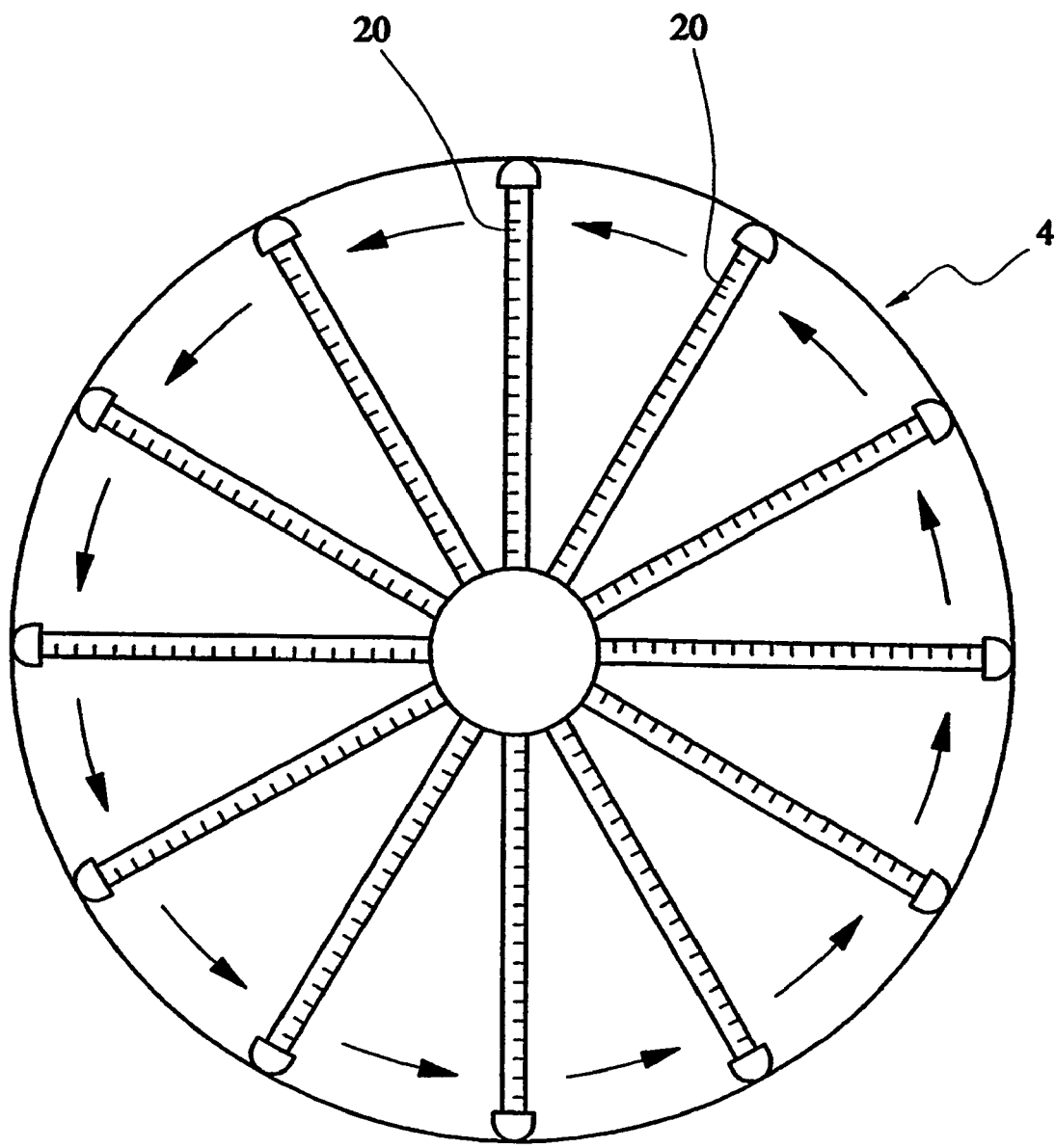
FIG. 2 is a plan view of drain arrangement of the filter apparatus of FIG. 1.
Figure 5:
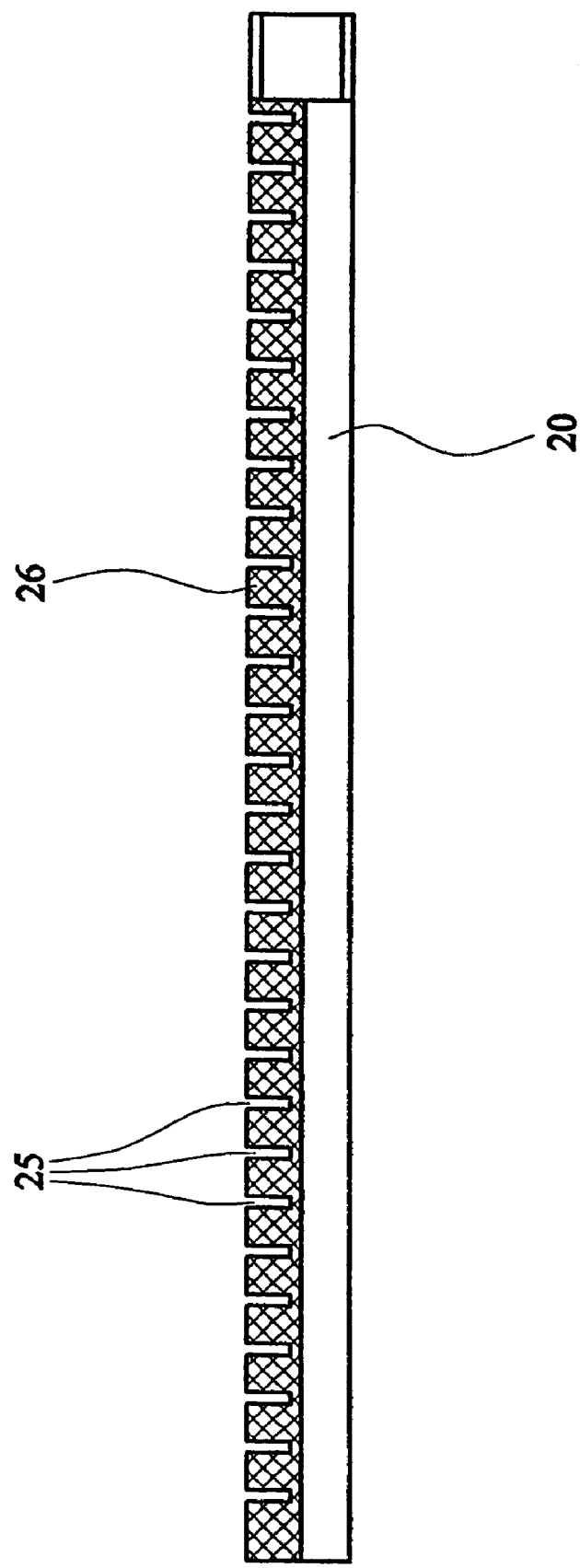
FIG. 5 is a schematic side view of a limb of the drain arrangement such as the drain arrangement shown in FIG. 2.

Referring now to FIG. 5 and FIG. 2 in particular, each radial limb 20 comprises aperture means permitting filtered liquid to enter (and backwash liquid to leave) via a preferred side of the relevant limb. The preferred side is common to the majority or all of the limbs 20 in the radial arrangement. In the embodiment shown, a series of substantial regularly spaced slots 25 are provided substantially along the entire length of the relevant side of the respective limb 20. Slots 25 are covered with a fine stainless steel mesh 26 to ensure that sand filter media does not enter into the drain arrangement 4. In backwash mode, backwash water pumped back through drain arrangement 4 is forced through the apertures 25 which, being directed in a common rotational sense for all limbs 20 in drain arrangement 4, results in fluidisation of the filter media bed 6 and bulk rotation in a common sense of the body of filter material about the central axis of vessel 2.

Fluidisation and rotation of the filter bed has been found to improve the backwash effectiveness.

By mounting the drain limbs directly in sand filter media (rather than typical prior art mounting in gravel on a concrete base) the backwash fluidisation and rotation of the sand filter bed is achieved. This arrangement is believed to be novel and inventive per se.

The present invention provides improvements in relation to performance of filter apparatus by improving the inlet distribution of liquid to be filtered into a filter vessel and also the drain outlet and backwash capability and efficiency.

There have been described and illustrated herein several embodiments of a filtration apparatus and corresponding method of operation. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

The invention claimed is:

1. A filtration apparatus for filtering liquid Including:
   a filtration vessel;
   an inlet arrangement in an upper portion of the filtration vessel for introducing liquid to be filtered into the filtration vessel, the inlet arrangement comprising a plurality of radially extending duct arms, each arm including outlet means to direct pressurized liquid downwardly and in a direction transverse to the arm, resulting in a helical downward flow;
   a body of filter media in the filtration vessel; and
   a drain arrangement to receive filtered liquid and remove it from the filtration vessel.

2. A filtration apparatus according to claim 1, wherein the inlet arrangement is disposed closely adjacent an upper internal surface of the filtration vessel.

3. A filtration apparatus according to claim 1, wherein the inlet arrangement is disposed closely adjacent an upper internal surface of the filtration vessel, the upper internal surface of the filtration vessel being inclined or concave from an upper portion to a lower portion proximate the periphery of the filtration vessel.

4. A filtration apparatus according to claim 1, wherein the liquid media is pressurized in the filtration vessel above the level of the filter media.

5. A filtration apparatus according to claim 1, wherein the duct arms are configured to direct the liquid media in one of a common clockwise sense and a common anticlockwise sense.

6. A filtration apparatus according to claim 1, wherein the duct arms are regularly spaced about an axis.

7. A filtration apparatus according to claim 1, wherein the duct arms are connected to a central plenum inlet chamber.

8. A filtration apparatus according to claim 1, wherein the drain arrangement operates in a backwash mode to force backwash liquid media through the filter media in substantially rotating flow about the filtration vessel, the drain arrangement including a plurality of limbs that extend along a radial direction.

9. A filtration apparatus according to claim 8, wherein the limbs of the drain arrangement include apertures, slots or other liquid passage means that operate to provide backwash liquid distribution in said backwash mode or filtered liquid collection in a normal filter mode.

10. A filtration apparatus according to claim 1, wherein the drain arrangement includes a plurality of limbs extending along a radial direction and backwash liquid distribution means being configured to distribute backwash liquid in a direction transverse to the radial direction of the respective limbs.

11. A filtration apparatus according to claim 1, wherein the drain arrangement includes a plurality of radially extending limbs, backwash outlet means of the limbs in the drain arrangement being configured such that in a backwash mode the majority of the limbs direct water in one of a clockwise sense and an anticlockwise sense.

12. A filtration apparatus according to claim 1, wherein the drain arrangement is positioned toward an interior base of the filtration vessel.

13. A filtration apparatus according to claim 1, wherein the drain arrangement includes a plurality of radially extending limbs and an interior base of the filtration vessel is inclined, concave or dish shaped, the radial limbs of the drain arrangement extending from a lower most end at a radial central zone of the filtration vessel to an upper end raised from the lower end and radially spaced from the center of the filtration vessel.

14. A filtration apparatus according to claim 1, wherein the drain arrangement includes a plurality of radially extending limbs, the limbs being inclined.

15. A filtration apparatus according to claim 1, wherein the drain arrangement includes a plurality of radially extending limbs, the limbs connecting with a radially central drain chamber.

16. A filtration apparatus according to claim 1, wherein the drain arrangement includes a plurality of radially extending limbs, and apertures provided over a majority of the length of the respective radial limbs.

17. A filtration apparatus according to claim 1, wherein the drain arrangement includes apertures providing backwash.

18. A filtration apparatus according to claim 1, wherein the drain arrangement includes apertures provided with guard means to inhibit filter media entering the drain arrangement.

* * * * *